(12) United States Patent
Sodani et al.

(10) Patent No.: US 8,825,989 B2
(45) Date of Patent: *Sep. 2, 2014

(54) TECHNIQUE TO PERFORM THREE-SOURCE OPERATIONS

(71) Applicant: Intel Corporation, Santa Clara, CA (US)

(72) Inventors: Avinash Sodani, Portland, OR (US); Stephan Jourdan, Portland, OR (US); Alexandre Farcy, Hillsboro, OR (US); Per Hammarlund, Hillsboro, OR (US)

(73) Assignee: Intel Corporation, Santa Clara, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/063,789

(22) Filed: Oct. 25, 2013

(65) Prior Publication Data

US 2014/0052963 A1    Feb. 20, 2014

Related U.S. Application Data

(63) Continuation of application No. 11/477,074, filed on Jun. 27, 2006, now Pat. No. 8,589,663.

(51) Int. Cl.
*G06F 9/30* (2006.01)

(52) U.S. Cl.
USPC .......................................................... 712/220

(58) Field of Classification Search
USPC .......................................................... 712/208
See application file for complete search history.

(56) References Cited

U.S. PATENT DOCUMENTS

| 5,764,971 | A | | 6/1998 | Shang et al. |
| 5,841,998 | A | * | 11/1998 | Isaman ........................ 712/208 |
| 5,854,921 | A | | 12/1998 | Pickett |
| 5,950,012 | A | | 9/1999 | Shiell et al. |
| 6,581,154 | B1 | | 6/2003 | Zaidi |

OTHER PUBLICATIONS

Hamacher, et al., "Computer Organization". McGraw-Hill Book Company, Second Edition, 1984. pp. 148-151.
Hamacher, et al., "Computer Organization". McGraw-Hill Book Company, Second Edition, 1984. pp. 29.
Hamacher, et al., "Computer Organization". McGraw-Hill Book Company, Second Edition, 1984. pp. 2, 12. and 152-155.
Patterson, et al., "Computer Architecture: A Quantitative Approach". Morgan Kaufmann Publishers, Third Edition, 2003. pp. 184-186 and 224-227.

* cited by examiner

*Primary Examiner* — Robert Fennema

(74) *Attorney, Agent, or Firm* — Trop, Pruner & Hu, P.C.

(57) ABSTRACT

A technique to perform three-source instructions. At least one embodiment of the invention relates to converting a three-source instruction into at least two instructions identifying no more than two source values.

19 Claims, 4 Drawing Sheets

TECHNIQUE TO PERFORM THREE-SOURCE OPERATIONS

This application is a continuation of U.S. patent application Ser. No. 11/477,074, filed Jun. 27, 2006, the content of which is hereby incorporated by reference.

BACKGROUND

1. Field

The present disclosure pertains to the field of computing and computer systems, and, more specifically, to the field of performing operations using more than two source values.

2. Background

Instructions used in some computers or processor architectures may identify source operands upon which to perform certain operations, such as load, store, or mathematical operations. Furthermore, the source operands may be identified by either an address of where they are stored or by the operand value itself (i.e., "immediate" value). Some instructions may identify two or more sources to be used in an operation prescribed by an instruction.

For example, some instructions, such as one that performs addition between two or more operands may identify three sources: a base address of a first operand, an index address of the first operand, and a second operand (immediate). Other instructions may identify other operands. Furthermore, depending on the architecture of a processor, the instructions may include sub-instruction operations, or "micro-operations" ("uops"), which identify three or more sources. For the purposes of this disclosure, "instruction", may be used to mean a macro-level instruction having one or more uops or the term "instruction" may be used to refer to a uop. In some processors, an instruction or uop that identifies three or more sources upon which to perform operations may require logic (hardware circuits and/or software) having three or more inputs, or "ports", and/or additional overhead to concurrently manage the performance of the prescribed operation pertaining to the three sources.

FIG. 1 illustrates a prior art processor architecture, in which a decoder unit is to receive and decode an instruction or uop identifying at least three sources, and stores the instruction or uop into a front-end queue to be accessed by the execution unit, which may include logic to perform out-of-order execution or in-order execution of instructions or uops. The execution unit, of which there may be multiple, may have three or more input ports and corresponding logic to handle the concurrent processing of the three or more sources identified by an instruction or uop. Instructions may be committed to processor state after the retirement unit retires the instructions or uops.

Unfortunately, the processor architecture (which may include other elements or stages), may require additional logic, such as read ports, etc., to support the processing of instruction or uops identifying three or more sources. Accordingly, the processor architecture may require extra die area, power consumption, etc., in order to support the instructions or uops identifying three or more sources.

BRIEF DESCRIPTION OF THE FIGURES

The present invention is illustrated by way of example and not limitation in the accompanying figures.

DETAILED DESCRIPTION

Embodiments of the invention relate to computer systems. More particularly, at least one embodiment of the invention relates to a technique to identify instructions or uops identifying three or more source values ("three-source" instructions or uops) and to represent or convert the three-source instructions or uops with/into two or more instructions identifying no more than two source values before executing the instructions or uops.

In one embodiment of the invention, three-source instructions or uops are identified before they are executed and converted into two or more instructions or uops, each identifying no more than two sources. In one embodiment, the three-source instructions/uops are identified and/or converted into two-source instructions/uops in the decode stage of a multi-stage processor, whereas in other embodiments, the three-source instructions/uops are identified and/or converted into two-source instructions/uops at other stages, including a pre-fetch or fetch stage. In one embodiment, three-source instructions/uops are executed as multiple instructions identifying no more than two sources by a out-of-order ("OOO") execution logic, which may include a number of logic units or stages that perform various functions prescribed by instructions/uops out of program order, before being retired and committed to processor state in program order. In other embodiments, instructions/uops may be executed in program order.

Advantageously, at least one embodiment negates, or at least mitigates, the need for at least some of the processing logic to support three or more source values corresponding to one instruction or uop. In particular, one embodiment of the invention abrogates the need for logic within an OOO processing stage of a pipelined processor to support any more than two input ports and corresponding processing logic, thereby reducing die area and/or power consumption within the OOO processing stage. In some embodiments, the die area and power consumption savings in the OOO processing stage may enable processor die area/power consumption to be conserved, accordingly.

Figure 1:
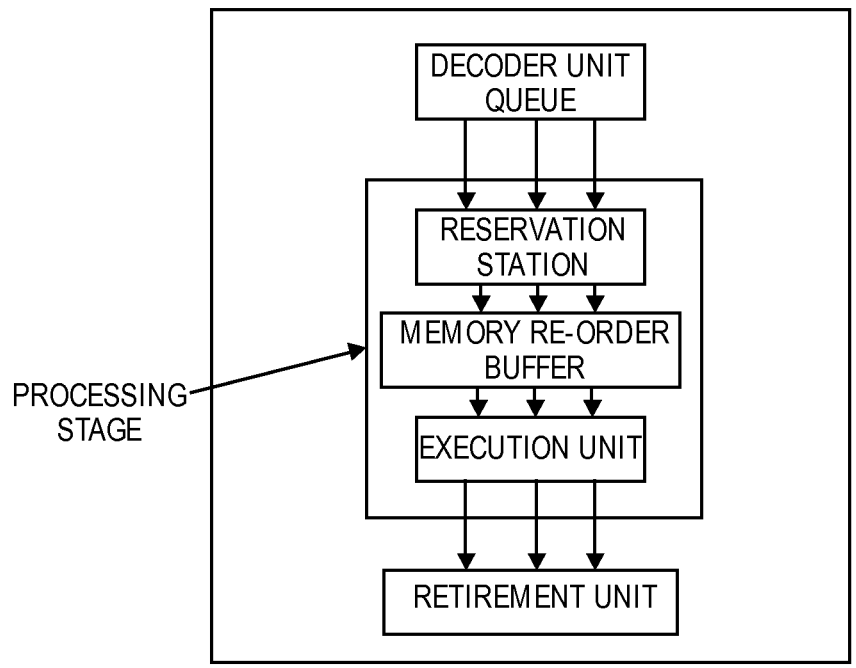
FIG. 1 illustrates a prior art processor architecture in which processing logic requires at least three input ports and possibly additional circuitry to support instructions or micro-operations ("uops") identifying three or more sources.
Figure 2:
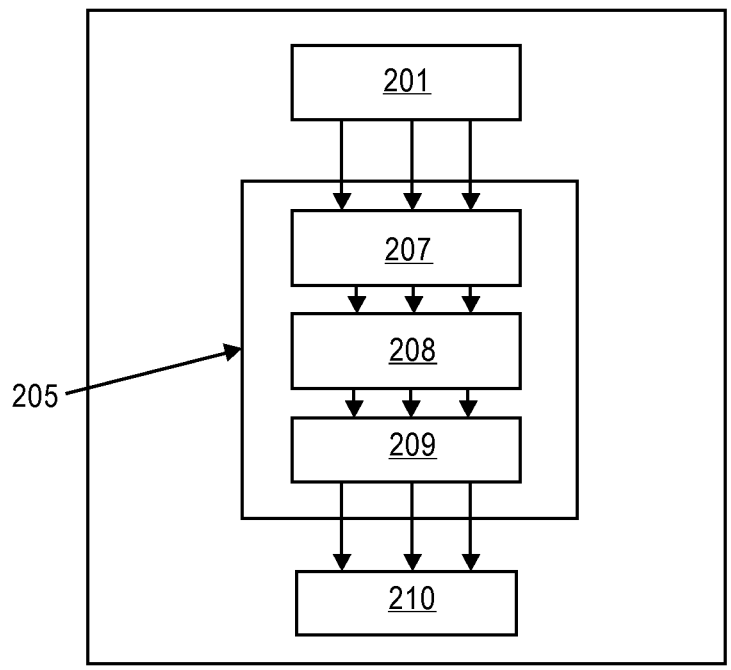
FIG. 2 illustrates a processor architecture, according to one embodiment, in which at least some instructions or uops identifying three or more sources are represented by at least two instructions or uops, each identifying no more than two sources.

FIG. 2 illustrates a processor architecture, according to one embodiment, in which a three-source instruction or uop is detected and converted into at least two two-source instructions/uops to perform one or more functions prescribed by the three-source instruction/uop. In particular, FIG. 2 illustrates processor 200, having a decode unit 201 to decode instructions or uops into operations to be performed by the processing stage 205 before the instructions/uops are retired by retirement unit 210. In one embodiment, the processing stage includes various processing logic and stages, including a reservation station (RS) 207, re-order buffer (ROB) 208, and execution unit (EU) 209. In other embodiments, other or additional logic or stages, such as a register allocation table (RAT), may be included in the processing stage.

In one embodiment, the RS, ROB, and EU each require no more than two input and output ports and corresponding logic to support the two or more two-source instructions/uops two which a three-source instruction/uop is converted by the decode unit. Although in one embodiment, the decode unit is responsible for converting a three-source instruction/uop into two or more two-source instructions/uops to perform a function prescribed by the three-source instruction/uop, in other embodiments, the conversion may be done at other stages, including at an instruction pre-fetch or fetch stage (not shown). Furthermore, in one embodiment, the processing stage may include logic to process instructions/uops out of program order, whereas in one embodiment, the processing stage includes logic to process instructions/uops in program order.

After a three-source instruction/uop is converted into two or more two-source instructions/uops, the two or more two-source instructions/uops may be stored in a front-end queue (which is illustrated as part of the decoder in FIG. 2), from which they may be accessed by the processing stage for execution. The two-source instructions/uops representing a three-source instruction/uop may be stored in the front-end queue in any order, including sequentially. In one embodiment, a field or bit within one or all of the two-source instructions/uops corresponding to the same three-source instruction/uop may indicate that the two-source instructions correspond to the same three-source instruction, such that they are retired in proper order. For example, in one embodiment, a field in one of the two-source instructions/uops may serve as a pointer to another corresponding two-source instruction/uop. In other embodiments, a code within each of the two-source instructions/uops may by the same, thereby indicating that they correspond to the same three-source instruction/uop, such that the processing stage may execute them out of program order but retire them in the proper sequence.

In one embodiment, a three-source instruction/uop is identified by logic (software or hardware) that tallies the number of sources identified in the instruction/uop. In other embodiments, the three-source instruction/uop may include a field that indicates it is a three-source instruction/uop, such that it will be identified as such as therefore converted into two-source instructions/uops.

In one embodiment, the logic included in the RS is reduced, as it only has to track two sources instead of three and must only support enough read ports for two sources. Likewise, in one embodiment, the ROB logic may be reduced as it only has to track two sources and support two read ports, instead of three, as in the prior art. In addition, other logic, in which the amount of logic is proportional to the number of sources per instruction or uop, may be reduced in some embodiments.

Figure 3:
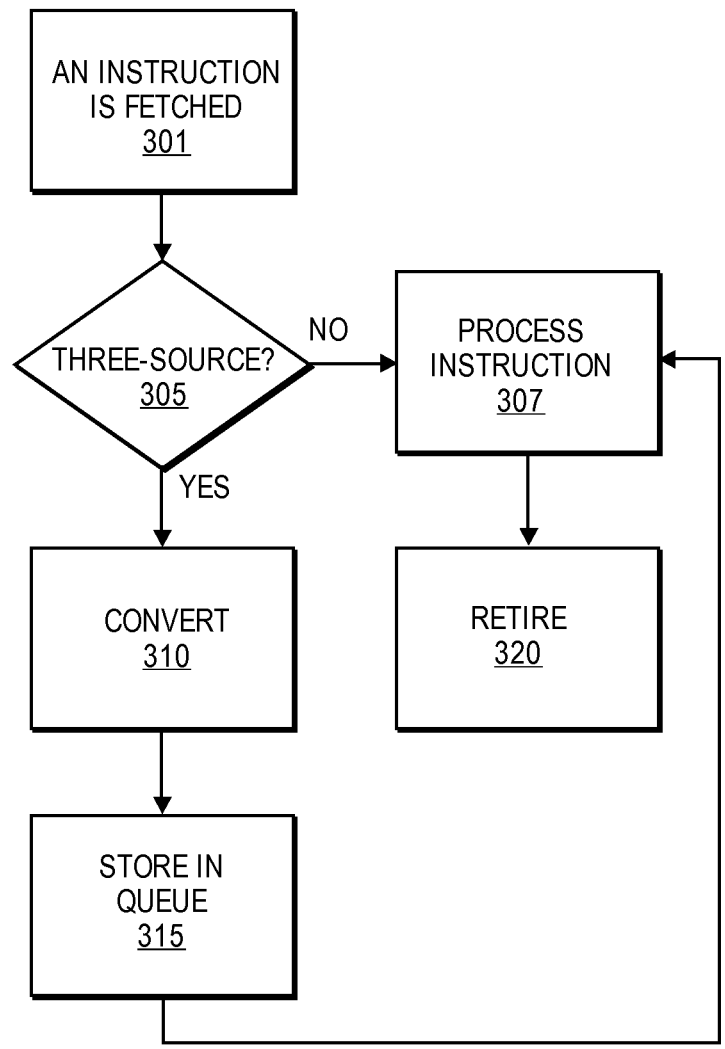
FIG. 3 is a flow diagram illustrating operations that may be used in at least one embodiment of the invention.

FIG. 3 is a flow diagram illustrating operations that may be used in at least one embodiment of the invention. In one embodiment, an instruction is fetched from a memory and decoded into at least one uop at operation 301, which may identify three source values used by the uop. In one embodiment, the uop corresponds to an addition operation identifying a base address and an index address to indicate where a first operand of the addition operation is stored, as well as a second addition operand (e.g., an immediate value). In other embodiments, the uop corresponds to other operations that may identify three or more source values, including subtraction and other mathematical operations.

If at operation 305, the uop is not identified to be at least a three-source uop, then the uop is processed, at operation 307, without a converting it into other uops having less than three sources. Otherwise, if the uop is identified as being a three-source uop, then the uop is converted into other uops identifying no more than two sources, at operation 310, that together can accomplish the same operation prescribed by the three-source uop. For example, if the three-source uop prescribes an addition operation to be performed, then the three-source addition uop may be converted into two uops: 1) a load uop to load a value identified by the base and index addresses of the corresponding three-source uop, and 2) an addition uop to add the operand returned by the load uop to the second value (e.g., immediate) identified by the three-source uop. In other embodiments, the three-source uop may be converted into other uops identifying other values to be used to accomplish the same function as the three-source uop.

At operation 315, the two uops to which the three-source uop was converted, are stored within a front-end buffer, such that they may be accessed by a processing stage of a processor. The two uops may be stored sequentially or non-sequentially. Furthermore, they may be stored contiguously or non-contiguously. In one embodiment, the two uops contain information, such as a pointer or other field, to indicate that they should be retired in a particular order. In other embodiments, their retirement order may be retained without including any other information within the uops themselves. For example, their retirement order may be inferred by virtue of the operations they perform and they data they use.

At operation 307, the two uops are processed by the processing stage. In one embodiment, the processing stage may be an OOO processing stage, such that the two uops are processed and executed out of program order, whereas in other embodiments they may be processed in program order. For example, in the case of an addition three-source uop that is converted into a one-source load uop and a corresponding two source addition uop, various functions associated with the addition uop may be performed before various functions associated with the load uop, or visa versa. In one embodiment, because no more than two sources are identified by the two uops (e.g., load and addition uops), the logic within the processing stage (e.g., RS, MOB, EU, etc.,) need only support no more than two read ports (i.e., input/output ports), thereby possibly saving on die space and power. At operation 320, the two or more uops, to which the three-source uop was converted, are retired in program order. In one embodiment, the above-described operations correspond to uops, whereas in other embodiments they apply to groups of uops (e.g., macro-instructions), depending on the architecture.

Figure 4:
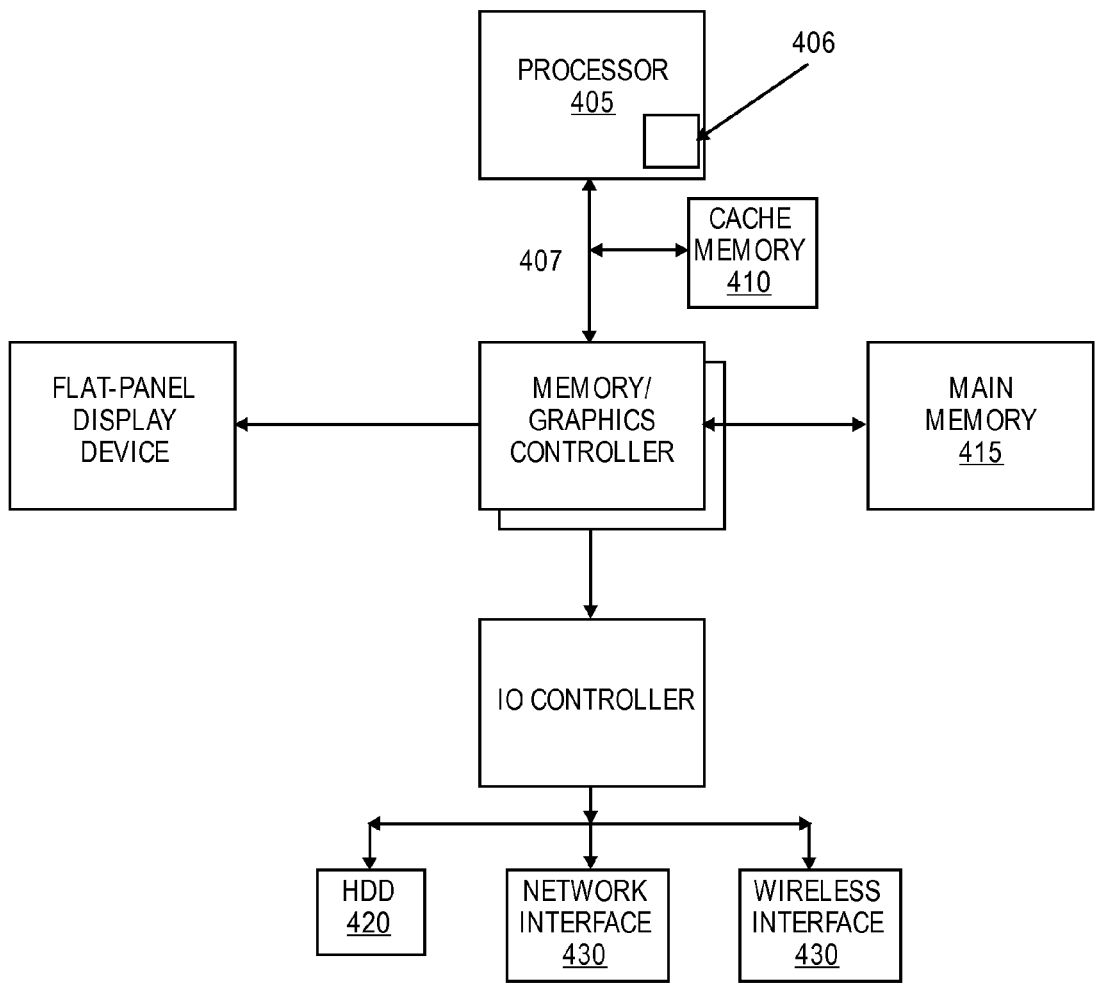
FIG. 4 illustrates a shared-bus computer system, in which at least one embodiment of the invention may be used.

FIG. 4 illustrates a front-side-bus (FSB) computer system in which one embodiment of the invention may be used. A processor 405 accesses data from a level one (L1) cache memory 410 and main memory 415. In other embodiments of the invention, the cache memory may be a level two (L2) cache or other memory within a computer system memory hierarchy. Furthermore, in some embodiments, the computer system of FIG. 4 may contain both a L1 cache and an L2 cache.

Illustrated within the processor of FIG. 4 is a storage area 406 for machine state. In one embodiment storage area may be a set of registers, whereas in other embodiments the storage area may be other memory structures. Also illustrated in FIG. 4 is a storage area 407 for save area segments, according to one embodiment. In other embodiments, the save area segments may be in other devices or memory structures. The processor may have any number of processing cores. Other embodiments of the invention, however, may be implemented within other devices within the system, such as a separate bus agent, or distributed throughout the system in hardware, software, or some combination thereof.

The main memory may be implemented in various memory sources, such as dynamic random-access memory (DRAM), a hard disk drive (HDD) 420, or a memory source located remotely from the computer system via network interface 430 containing various storage devices and technologies. The cache memory may be located either within the processor or in close proximity to the processor, such as on the processor's local bus 407.

Figure 5:
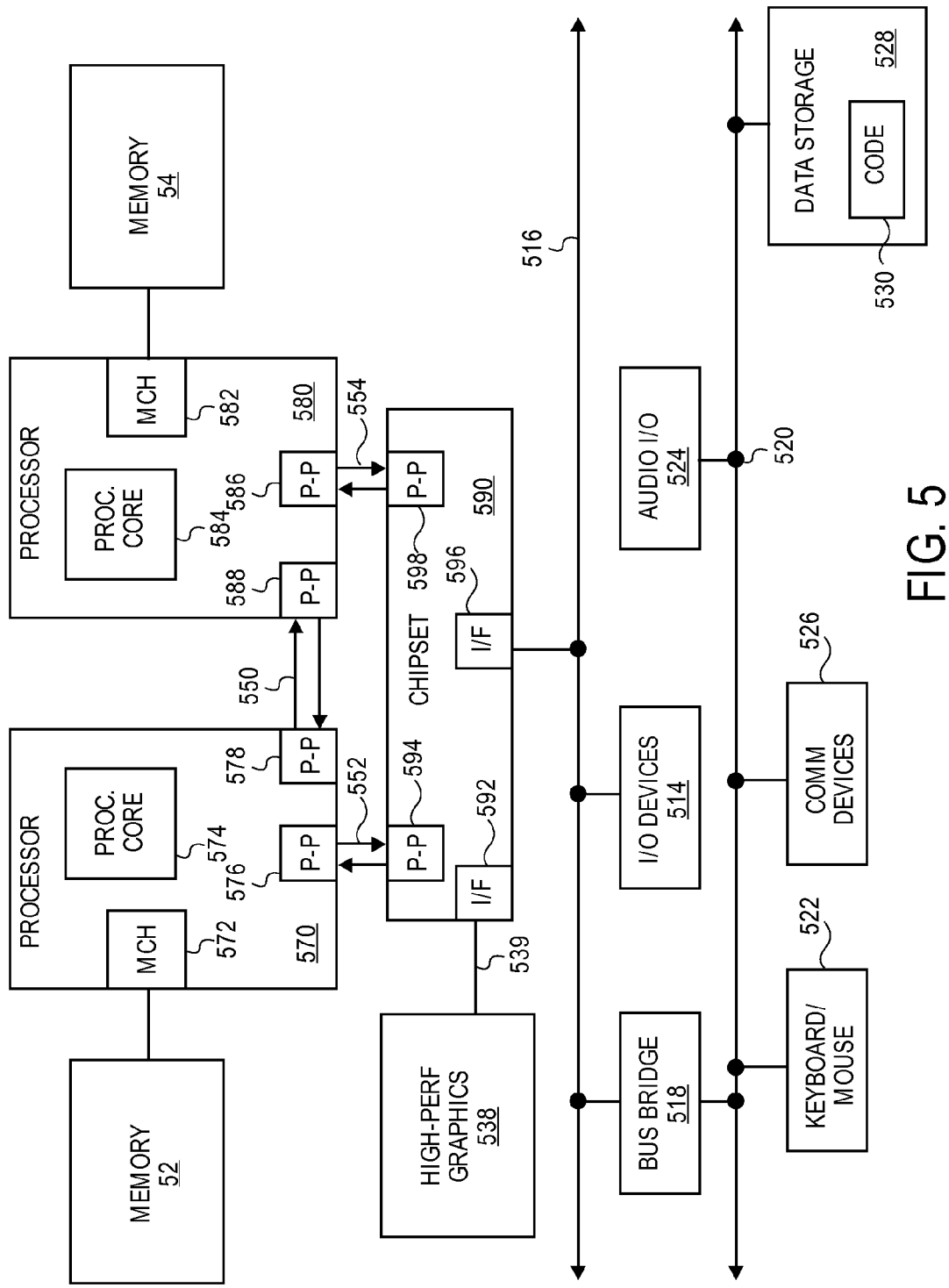
FIG. 5 illustrates a point-to-point bus computer system, in which at least one embodiment of the invention may be used.

Furthermore, the cache memory may contain relatively fast memory cells, such as a six-transistor (6T) cell, or other memory cell of approximately equal or faster access speed. The computer system of FIG. 4 may be a point-to-point (PtP) network of bus agents, such as microprocessors, that communicate via bus signals dedicated to each agent on the PtP network. FIG. 5 illustrates a computer system that is arranged in a point-to-point (PtP) configuration. In particular, FIG. 5 shows a system where processors, memory, and input/output devices are interconnected by a number of point-to-point interfaces.

The system of FIG. 5 may also include several processors, of which only two, processors 570, 580 are shown for clarity. Processors 570, 580 may each include a local memory controller hub (MCH) 572, 582 to connect with memory 22, 24. Processors 570, 580 may exchange data via a point-to-point (PtP) interface 550 using PtP interface circuits 578, 588. Processors 570, 580 may each exchange data with a chipset 590 via individual PtP interfaces 552, 554 using point to point interface circuits 576, 594, 586, 598. Chipset 590 may also exchange data with a high-performance graphics circuit 538 via a high-performance graphics interface 539. Embodiments of the invention may be located within any processor having any number of processing cores, or within each of the PtP bus agents of FIG. 5.

Other embodiments of the invention, however, may exist in other circuits, logic units, or devices within the system of FIG. 5. Furthermore, in other embodiments of the invention may be distributed throughout several circuits, logic units, or devices illustrated in FIG. 5.

Processors referred to herein, or any other component designed according to an embodiment of the present invention, may be designed in various stages, from creation to simulation to fabrication. Data representing a design may represent the design in a number of manners. First, as is useful in simulations, the hardware may be represented using a hardware description language or another functional description language. Additionally or alternatively, a circuit level model with logic and/or transistor gates may be produced at some stages of the design process. Furthermore, most designs, at some stage, reach a level where they may be modeled with data representing the physical placement of various devices. In the case where conventional semiconductor fabrication techniques are used, the data representing the device placement model may be the data specifying the presence or absence of various features on different mask layers for masks used to produce an integrated circuit.

In any representation of the design, the data may be stored in any form of a machine-readable medium. An optical or electrical wave modulated or otherwise generated to transmit such information, a memory, or a magnetic or optical storage medium, such as a disc, may be the machine-readable medium. Any of these mediums may "carry" or "indicate" the design, or other information used in an embodiment of the present invention, such as the instructions in an error recovery routine. When an electrical carrier wave indicating or carrying the information is transmitted, to the extent that copying, buffering, or re-transmission of the electrical signal is performed, a new copy is made. Thus, the actions of a communication provider or a network provider may be making copies of an article, e.g., a carrier wave, embodying techniques of the present invention.

Thus, techniques for steering memory accesses, such as loads or stores are disclosed. While certain embodiments have been described, and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

Various aspects of one or more embodiments of the invention may be described, discussed, or otherwise referred to in an advertisement for a processor or computer system in which one or more embodiments of the invention may be used. Such advertisements may include, but are not limited to news print, magazines, billboards, or other paper or otherwise tangible media. In particular, various aspects of one or more embodiments of the invention may be advertised on the internet via websites, "pop-up" advertisements, or other web-based media, whether or not a server hosting the program to generate the website or pop-up is located in the United States of America or its territories.

What is claimed is:

1. A processor comprising:
a decoder unit to decode and convert a first instruction corresponding to a three-source micro-operation (uop), in which is identified at least three source operands and a single mathematical operation to be performed on the at least three source operands, into at least two instructions, each identifying no more than two source operands, to perform a function prescribed by the first instruction; and
a processing stage to perform the at least two instructions, the processing stage including a plurality of stages, each having no more than two read ports to receive the no more than two source operands of the at least two instructions.

2. The processor of claim 1, wherein the decoder unit is to convert the three-source uop into at least two two-source uops.

3. The processor of claim 1, wherein the plurality of stages includes a reservation station, a re-order buffer, and an execution unit.

4. The processor of claim 3, wherein the execution unit is to perform the at least two instructions out of program order.

5. The processor of claim 4, further comprising a retirement unit to retire the at least two instructions in program order.

6. The processor of claim 5, wherein each of the at least two instructions includes a field to indicate correspondence to the first instruction.

7. The processor of claim 5, wherein the first one of the at least two instructions includes a pointer to a second one of the at least two instructions.

8. The processor of claim 7, wherein the pointer is to indicate an order of retirement.

9. The processor of claim 3, further comprising a register allocation table.

10. The processor of claim 3, wherein the decoder unit comprises a queue to store the at least two instructions.

11. The processor of claim 1, wherein the first instruction includes a field to indicate that the first instruction is a three source instruction.

12. A system comprising:
a processor including a decoder to decode a first instruction that identifies a single mathematical operation to be performed on three source operands into a three-source micro-operation (uop) and to convert the three-source uop into at least two uops, each identifying no more than two corresponding source data, each of the at least two uops including a field to indicate that it corresponds to the three-source uop, wherein the processor includes an execution unit to process the at least two uops to perform the single mathematical operation based on the indication of the field; and
a dynamic random access memory (DRAM) coupled to the processor.

13. The system of claim 12, wherein the processor further comprises a retirement unit to retire the at least two uops in program order.

14. The system of claim 12, wherein the processor further comprises a reservation station and a re-order buffer.

15. The system of claim 12, wherein the processor includes multiple processor cores.

16. A non-transitory machine-readable medium having stored thereon instructions, which if performed by a machine cause the machine to perform a method comprising:
fetching a first instruction having three source values from a memory;
decoding the first instruction into a three-source micro-operation (uop), wherein the three-source uop identifies at least three source operands corresponding to an operation to be performed by the three-source uop; and
converting the three-source uop into at least two uops, each identifying no more than two of the three source operands, at least one of the at least two uops including a field to indicate that the uop corresponds to the three-source uop.

17. The non-transitory machine-readable medium of claim 16, wherein the method further comprises performing the at least two uops out of program order, and retiring the at least two uops in program order.

18. The non-transitory machine-readable medium of claim 16, wherein a second of the at least two uops identifies a second operand to be operated on by the second uop.

19. The non-transitory machine-readable medium of claim 16, wherein the field is present in the one of the at least two uops to serve as a pointer to a second of the at least two uops.

* * * * *